No. 757,472. PATENTED APR. 19, 1904.
H. G. LANGE.
CANDY FLATTING MACHINE.
APPLICATION FILED SEPT. 14, 1903.
NO MODEL.

Attest:
John Enders,
M. H. Holmes.

Inventor:
Henry G. Lange,
by Robert Burns
Attorney.

No. 757,472. Patented April 19, 1904.

UNITED STATES PATENT OFFICE.

HENRY G. LANGE, OF CHICAGO, ILLINOIS.

CANDY-FLATTING MACHINE.

SPECIFICATION forming part of Letters Patent No. 757,472, dated April 19, 1904.

Application filed September 14, 1903. Serial No. 173,037. (No model.)

*To all whom it may concern:*

Be it known that I, HENRY G. LANGE, a citizen of the United States of America, and a resident of Chicago, in the county of Cook and State of Illinois, have invented certain new and useful Improvements in Candy-Flatting Machines, of which the following is a specification.

The present invention relates to confectionery apparatus, and has for its object to provide a simple and efficient structural arrangement and combination of parts adapted to impart a flattened formation to globular or other like masses of candy or confectionery in a rapid, uniform, and continuous manner, as will hereinafter more fully appear and be more particularly pointed out in the claims.

Figure 1:
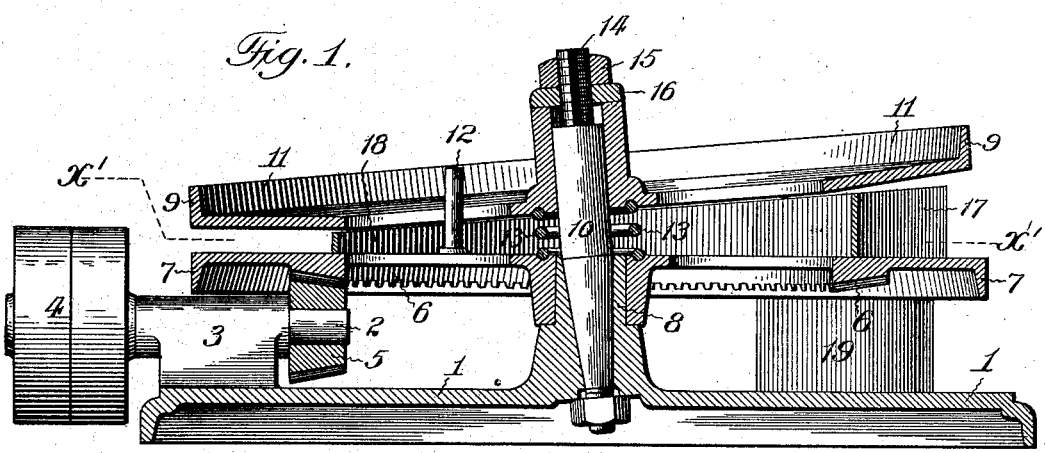
Figure 2:
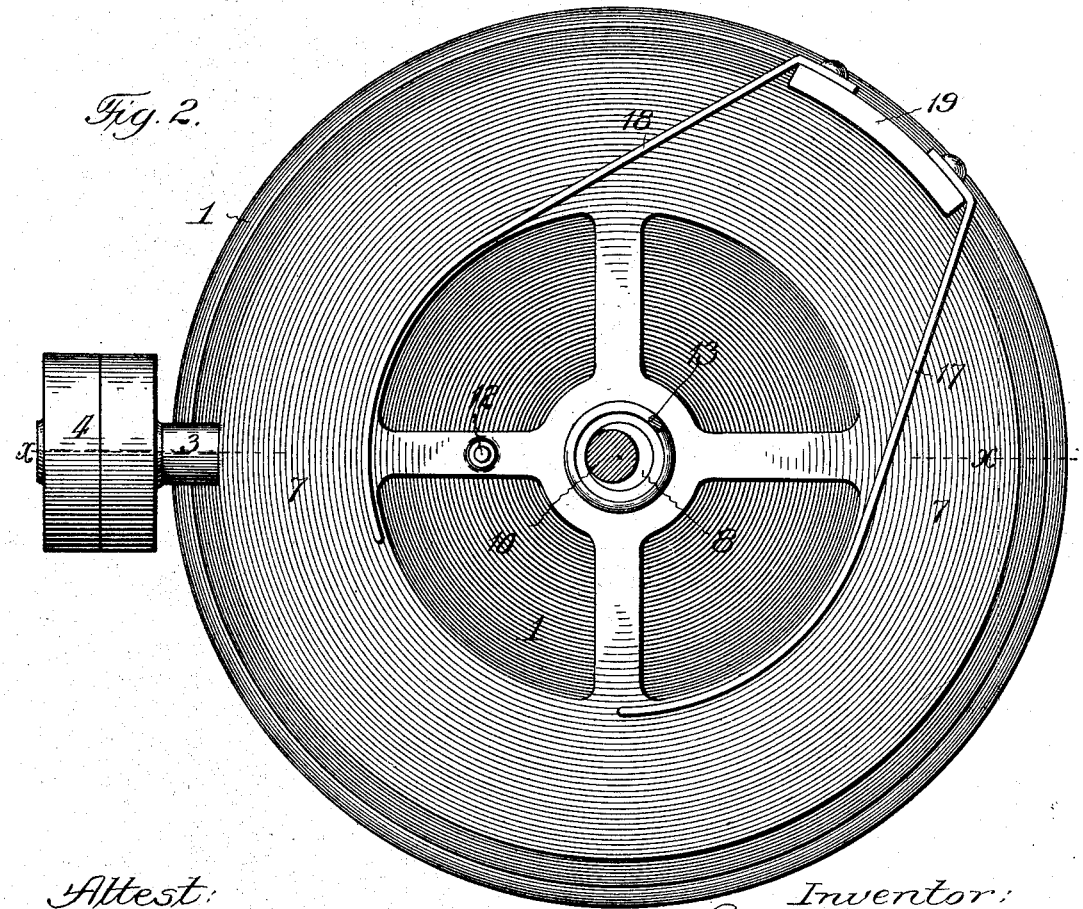

In the accompanying drawings, illustrative of the present invention, Figure 1 is a central vertical sectional elevation at line $xx$, Fig. 2, of an apparatus embodying the present invention. Fig. 2 is a horizontal sectional elevation of the same at line $x'x'$, Fig. 1.

Similar numerals of reference indicate like parts in both views.

Referring to the drawings, 1 represents the supporting-base of any usual and suitable construction; 2, a driving-shaft journaled in a supporting-bracket 3 on the base 1 and provided at one end with a driving-pulley 4 and at the other end with a bevel-pinion 5, which meshes with and drives an annular bevel-rack 6 on the under side of the under flatting-disk of the present invention.

7 is the under flatting-disk of the present invention, which has preferably a plane upper surface, as shown, and such disk is mounted to rotate upon an upwardly-extending circular boss 8 of the main base 1, as shown in Fig. 1.

9 is the upper flatting-disk of the present invention, which is supported in any usual and suitable manner in an angular relation to the under flatting-disk 7, preferably by means of a journal-stud 10, socketed in an oblique bore in the circular boss 8 aforesaid, with its upper cylindrical portion forming a bearing upon which the upper flatting-disk 9 is capable of rotation in the practical operation of the apparatus.

In the preferred form of the present invention the marginal portion 11 of the upper flatting-disk 9 will have a conical formation, as shown in Fig. 1, so that the active flatting-surfaces of the two disks when at the point of nearest approximation will have a substantially parallel relation.

12 is a drawing-pin secured to the under disk 7 at a point removed from the axis of rotation thereof and adapted to have a laterally loose engagement in an orifice in the upper disk 9, so as to cause a rotation of both disks in unison.

13 is a spiral spring interposed at a central point between the flatting-disks 7 and 9 with a tendency to force said disks apart.

14 is a screw-threaded extension at the upper end of the journal-stud 10, upon which a nut 15 screws to effect a downward adjustment of the upper flatting-disk 9.

16 is a bearing-collar interposed between the nut 15 and the adjacent surface of the upper flatting-disk and adapted to have longitudinal non-rotative adjustment upon the threaded extension 14 aforesaid in any usual and well-known manner, the construction being such that the ordinary rotation of the upper flatting-disk in continued use will have no frictional effect upon the adjusting-nut 15 to cause a rotation of said nut and a consequent change in the relative adjustment of the one flatting-disk to the other.

17 is a stationary guide-plate projecting between the flatting-disks and adapted to guide and regulate the entrance of the globular masses of candy, &c., to be flattened.

18 is a stationary tangential discharge-plate also projecting between the flatting-disks aforesaid and adapted to discharge the pieces of candy, &c., from between the disks after the flatting operation of such disks upon such pieces of candy, &c.

19 is a vertical post upon the base 1, to which the respective plates 17 and 18 are attached.

In practical use the globular masses of candy, &c., are introduced between the flatting-disks at the point of greatest separation thereof, and in the continued rotation of such disks the said globular masses are flattened and then discharged from between said disks.

Having thus fully described my said invention, what I claim as new, and desire to secure by Letters Patent, is—

1. In a candy-flatting machine, the combination of a supporting-base, a pair of opposed flatting-disks, journaled to revolve in angular relation one to the other, and means for causing said disks to revolve in unison, substantially as set forth.

2. In a candy-flatting machine, the combination of a supporting-base, a pair of opposed flatting-disks, one of which is formed with a conical marginal portion, means journaling said disks in angular relation one to the other, and means for causing said disks to revolve in unison, substantially as set forth.

3. In a candy-flatting machine, the combination of a supporting-base, a pair of opposed flatting-disks, journaled to revolve in angular relation one to the other, and means for causing said disks to revolve in unison, the same comprising a driving-pin on one disk engaging an orifice in the other disk, substantially as set forth.

4. In a candy-flatting machine, the combination of a supporting-base, a pair of opposed flatting-disks, one of which is formed with a conical marginal portion, means journaling said disks in angular relation one to the other, and means for causing said disks to revolve in unison, the same comprising a driving-pin on one disk engaging an orifice in the other disk, substantially as set forth.

5. In a candy-flatting machine, the combination of a supporting-base, a pair of opposed flatting-disks, journaled to revolve in angular relation one to the other, a tangential discharge-plate arranged between said disks, and means for causing said disks to revolve in unison, substantially as set forth.

6. In a candy-flatting machine, the combination of a supporting-base, a pair of opposed flatting-disks, one of which is formed with a conical marginal portion, means journaling said disks in angular relation one to the other, a tangential discharge-plate arranged between said disks and means for causing said disks to revolve in unison, substantially as set forth.

7. In a candy-flatting machine, the combination of a supporting-base, a pair of opposed flatting-disks, journaled to revolve in angular relation one to the other, a guide-plate and a tangential discharge-plate arranged between said disks, and means for causing said disks to revolve in unison, substantially as set forth.

8. In a candy-flatting machine, the combination of a supporting-base, a pair of opposed flatting-disks, one of which is formed with a conical marginal portion, means journaling said disks in angular relation one to the other, a guide-plate and a tangential discharge-plate arranged between said disks, and means for causing said disks to revolve in unison, substantially as set forth.

9. In a candy-flatting machine, the combination of a supporting-base, an under flatting-disk journaled upon a central boss on said base and provided with an annular rack on its under side, an upper flatting-disk journaled in angular relation to the under flatting-disk, an obliquely-arranged journal-stud socketed in the central boss aforesaid and forming a journal-bearing for the upper flatting-disk, a driving-shaft carrying a bevel-pinion meshing with the annular rack aforesaid, and means for causing said disks to revolve in unison, substantially as set forth.

10. In a candy-flatting machine, the combination of a supporting-base, an under flatting-disk journaled upon a central boss on said base and provided with an annular rack on its under side, an upper flatting-disk journaled in angular relation to the under flatting-disk, one of said disks having a conical marginal portion, an obliquely-arranged journal-stud socketed in the central boss aforesaid and forming a journal-bearing for said upper disk, a driving-shaft carrying a bevel-pinion meshing with the annular rack aforesaid, and means for causing said disks to revolve in unison, substantially as set forth.

11. In a candy-flatting machine, the combination of a supporting-base, an under flatting-disk journaled upon a central boss on said base and provided with an annular rack on its under side, an upper flatting-disk journaled in angular relation to the under flatting-disk, an obliquely-arranged journal-stud socketed in the central boss aforesaid and forming a journal-bearing for the upper flatting-disk, a driving-shaft carrying a bevel-pinion meshing with the annular rack aforesaid, and a driving-pin on one disk engaging in an orifice in the other disk and cause a rotation of both disks in unison, substantially as set forth.

12. In a candy-flatting machine, the combination of a supporting-base, an under flatting-disk journaled upon a central boss on said base and provided with an annular rack on its under side, an upper flatting-disk journaled in angular relation to the under flatting-disk, one of said disks having a conical marginal portion, an obliquely-arranged journal-stud socketed in the central boss aforesaid and forming a journal-bearing for said upper disk, a driving-shaft carrying a bevel-pinion meshing with the annular rack aforesaid, and a driving-pin on one disk engaging in an orifice in the other disk and cause a rotation of both disks in unison, substantially as set forth.

13. In a candy-flatting machine, the combination of a supporting-base, an under flatting-disk journaled upon a central boss on said base and provided with an annular rack on its under side, an upper flatting-disk journaled in angular relation to the under flatting-disk, an obliquely-arranged journal-stud socketed in the central boss aforesaid and forming a journal-bearing for the upper flatting-disk, a driving-shaft carrying a bevel-pinion meshing with the annular rack aforesaid, a tangential discharge-plate arranged between said disks, and means for causing said disks to revolve in unison, substantially as set forth.

14. In a candy-flatting machine, the combination of a supporting-base, an under flatting-disk journaled upon a central boss on said base and provided with an annular rack on its under side, an upper flatting-disk journaled in angular relation to the under flatting-disk, an obliquely-arranged journal-stud socketed in the central boss aforesaid and forming a journal-bearing for the upper flatting-disk, a driving-shaft carrying a bevel-pinion meshing with the annular rack aforesaid, a guide-plate and a tangential discharge-plate arranged between said disks, and means for causing said disks to revolve in unison, substantially as set forth.

15. In a candy-flatting machine, the combination of a supporting-base, an under flatting-disk journaled upon a central boss on said base and provided with an annular rack on its under side, an upper flatting-disk journaled in angular relation to the under flatting-disk, an obliquely-arranged journal-stud socketed in the central boss aforesaid and forming a journal-bearing for the upper flatting-disk, a driving-shaft carrying a bevel-pinion meshing with the annular rack aforesaid, a spiral spring interposed centrally between said disks, a screw-threaded extension at the upper end of said stud, a nut engaging the same, and an interposed washer having a non-rotative longitudinal adjustment on said extension, substantially as set forth.

Signed at Chicago, Illinois, this 11th day of September, 1903.

HENRY G. LANGE.

Witnesses:
ROBERT BURNS,
M. H. HOLMES.